United States Patent [19]

Hopkins et al.

[11] Patent Number: 4,852,338

[45] Date of Patent: Aug. 1, 1989

[54] DEBRIS COLLECTOR FRAME AND ASSEMBLY

[75] Inventors: John W. Hopkins; Peter P. Knoell, both of Charlotte, N.C.

[73] Assignee: Textron Inc., Providence, R.I.

[21] Appl. No.: 142,804

[22] Filed: Jan. 11, 1988

[51] Int. Cl.$^4$ ............................................. A01D 34/70
[52] U.S. Cl. ....................................................... 56/202
[58] Field of Search .................................. 56/202, 16.6

[56] References Cited

U.S. PATENT DOCUMENTS

| | | | |
|---|---|---|---|
| 3,881,304 | 5/1975 | Lempke | 56/202 |
| 3,974,631 | 8/1976 | Rhodes | 56/202 |
| 4,047,368 | 9/1977 | Peterson | 56/202 |
| 4,054,023 | 10/1977 | Carpenter | 56/202 |
| 4,126,986 | 11/1978 | Kidd | 56/202 |
| 4,149,362 | 4/1979 | Haffner et al. | 56/202 |
| 4,156,337 | 5/1979 | Knudson | 56/16.6 |
| 4,168,600 | 9/1979 | Klug et al. | 56/202 |
| 4,173,111 | 11/1979 | Peterson | 56/202 |
| 4,393,645 | 7/1983 | Moore | 56/202 |
| 4,522,019 | 6/1985 | Edwards et al. | 56/16.6 |
| 4,532,755 | 8/1985 | Schemelin et al. | 56/202 |
| 4,532,756 | 8/1985 | Merkel | 56/16.6 |
| 4,589,251 | 5/1986 | Amano et al. | 56/202 |
| 4,637,202 | 1/1987 | Lamusga | 56/202 |
| 4,699,393 | 10/1987 | Schweigert | 56/202 |
| 4,738,088 | 4/1988 | Klever et al. | 56/202 |

Primary Examiner—Paul J. Hirsch
Attorney, Agent, or Firm—Abraham Ogman

[57] ABSTRACT

The invention is directed to a lightweight debris collector for rotary mowers and the like. The debris collector includes a frame having two spaced apart arms which are adapted to suspend and transport a standard trash can. Means is also provided to transport debris from the mower to the trash can which together with the frame form a debris collector assembly.

14 Claims, 5 Drawing Sheets

DEBRIS COLLECTOR FRAME AND ASSEMBLY

BACKGROUND

The invention is directed to a debris collector frame and assembly for use in particular with so called riding mowers.

For purposes of this discussion the term debris shall include grass clippings, leaves, twigs, litter and the like that is swept up by the mower and entrained in a discharge air stream.

It is a common practice to provide or offer as a purchasable option a debris collector (also called a debris catcher) for collecting debris picked up by the mower and discharge through a discharge opening defined in the skirt of the housing of a mower. Conventionally a debris collector assembly comprises a receptacle which is transported by the mower, and a cover overlying the receptacle for delivering debris to the receptacle.

There is also included a chute in the form of a tube which links the discharge opening and the cover and acts as a conduit for carrying debris entrained in air to the cover and ultimately to the receptacle.

There are literally hundreds of schemes for debris collector assemblies. Representative of concepts which have relevance to this invention are found in the following patents. In U.S. Pat. No. 2,990,666 a debris collector is mounted above a walking mower. The receptacle is supported by a bracket from the mower deck.

U.S. Pat. No. 2,910,818 shows a debris collector assembly containing a receptacle which is attached to the handle of a walking mower.

U.S. Pat. No. 3,903,565 describes means for encircling a receptacle for holding the receptacle in place.

U.S. Pat. No. 3,494,116 shows a side discharge collector where the receptacle is supported by a bracket attached to back of the mower.

U.S. Pat. No. 4,095,398 shows a rear collector for a riding mower where receptacle contains a bracket attachable to the mower and a custom made cover, chute and negative pressure source.

U.S. Pat. No. 3,716,977 shows a rear collector assembly attached to the mower by means of a bracket. The receptacle, its frame, the cover and chute represent a fully integrated system.

There are also schemes for providing a floor under a receptacle to transport the receptacle.

OBJECTS

It is an object of the invention to provide a debris collector frame and assembly which avoids the limitations and disadvantages of earlier concepts.

It is another object of the invention to provide a debris collector frame and assembly which utilizes conventional trash cans as receptacles.

It is another object of the invention to provide a debris collector frame and assembly which is easily attached to a mower and usable with almost any riding mower.

It is yet another object of the invention to provide a debris collector frame and assembly which can be fabricated inexpensively from standard tubes and bars.

It is still another object of the invention to provide a frame and assembly for a debris collector where the receptacle is suspended so that it can move relative to the frame and mower.

BRIEF DESCRIPTION OF THE INVENTION

In accordance with the invention there is a frame for a debris receptacle which comprises a pair of arms configured to encircle at least partially a debris receptacle. The arms include means for engaging the receptacle for suspending and transporting the receptacle. The arms are secured to the mower by a crossbar which is attached to a depending support bar or tube that includes means for attaching the bar or tube vertically to the mower.

A debris collector assembly includes in addition a lateral arm attached to the crossbar or vertical bar. The assembly also includes a chute which links the discharge opening of the mower housing to a cover which is adapted to fit over the top of the receptacle.

BRIEF DESCRIPTION OF THE DRAWINGS

For a fuller understanding of the invention reference should be made to the detailed description taken together with the accompanying drawings. Similar reference numbers and symbols refer to similar parts throughout the several drawings.

DETAILED DESCRIPTION

Figure 1:
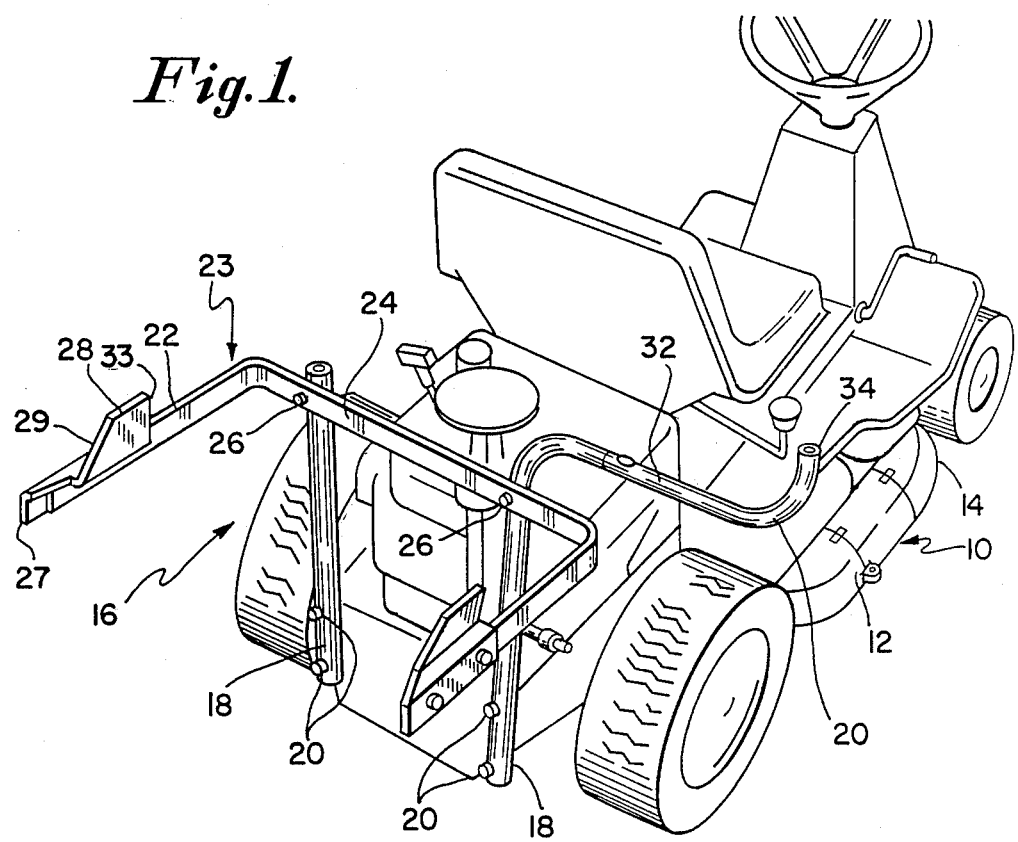
FIG. 1 shows a debris collector frame embodying the concepts of the invention mounted to a riding mower.

Referring to FIG. 1 of the drawings there is shown a riding mower 10 including a conventional housing 12 and a discharge opening 14 through which debris leaves the housing to be collected or dispersed over the ground.

Attached to the rear of the mower is a debris collector frame 16 embodying the principles of the present invention. In the illustrated configuration the frame 16 includes a pair of parallel vertical support members 18 which are attached to the mower 10 by pairs of bolts 20. The support means 18 may be formed from elongated bars or tubes.

Attached near the top of the support means 18 is a U-shaped crossbar 23 having a pair of spaced and parallel arms 22 joined to a crossbar 24. The crossbar is joined to the support means by means of bolts 26

In the preferred embodiment illustrated two parallel support means are shown. A single centrally located support means may be used as well.

Figure 4:
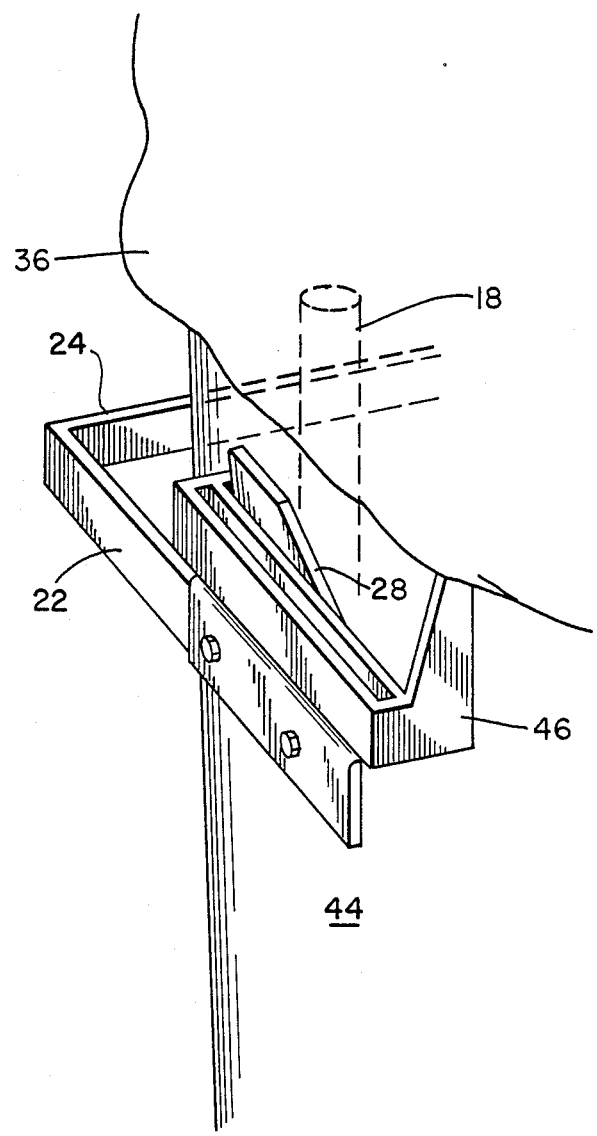
FIG. 4 shows a detail of projection means on an arm of the frame which interacts with the handle means of a standard trash cans.
Figure 5:
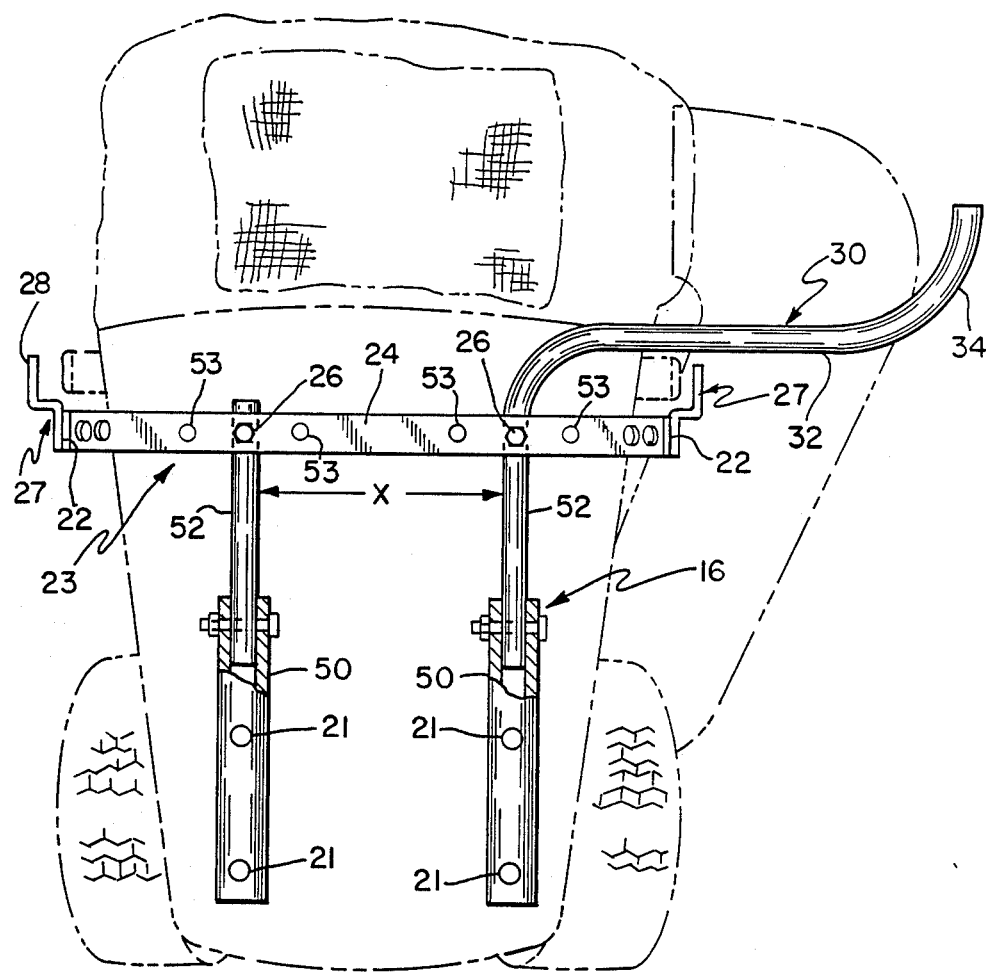
FIG. 5 shows an alternate frame structure embodying the principles of the invention.

The arms 22 are configured to partially encircle a standard trash, or garbage,can either round or rectangular. The arms 22 also include brackets 27 secured to the arms by bolts 31. See FIG. 4. The brackets in FIG. 1 are mounted on the outside surface of the arms 22. They may be mounted on the inside surface as well as seen in Fig.5.

The brackets 27 each contains an upward projection or finger 28 which is configured to fit within the hole that is formed by the handles of conventional trash cans. More particularly each upward projections 28 is configured in the form of a trapezoid and has a vertical front edge 33 and a rear sloping edge 29.

Alternatively the arms may contain means which are configured to fit under the rim of a trash can for suspending the trash can.

The right hand support means 18 in FIG. 1 includes a lateral projection 30 which is essentially L-shaped having a horizontal member 32 terminated in an upturned vertical portion 34.

Figure 2:
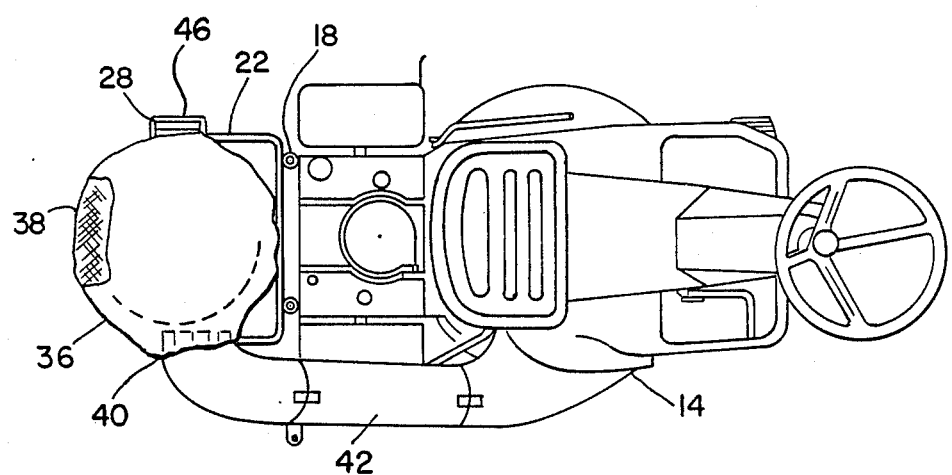
FIG. 2 shows a debris collector assembly embodying the principles of the present invention. The assembly includes a chute, a cover and a trash can suspended in the frame.

Referring to FIG. 2 there is shown a debris collector assembly comprising the frame 16 and in addition a cover 36 which includes a perforated section 38 to allow air to escape and an inlet 40 through which debris is carried to the cover and receptacle.

In the preferred embodiment the cover 36 overlies the top opening of the receptacle (See FIG. 3) and is secured to the opening by means of an elastic or drawstring. In the preferred embodiment the cover 36 is made of a flexible fabric and is collapsible. Alternatively, the cover 36 may be semi rigid or rigid.

Should a rigid cover be used it may be used to support a chute possibly eliminating the lateral projection 30 which normally supports the chute.

The debris collector assembly also includes a chute 42 which links the discharge opening in the mower housing to the inlet 40 in the cover 36 for carrying debris entrained in the discharge stream from the mower to the cover and the receptacle. The chute 42 is joined to inlet 40 by means of an elastic or drawstring.

Figure 3:
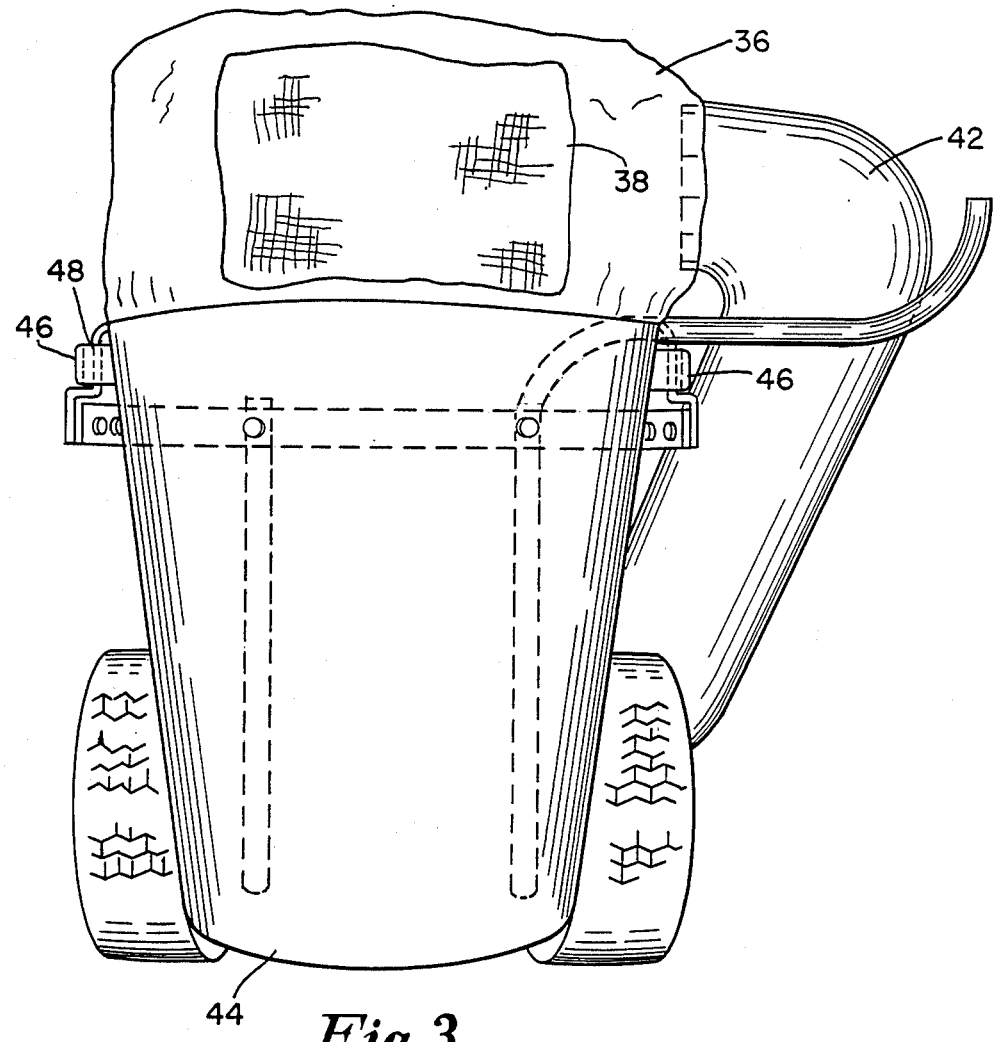
FIG. 3 is a rear view of the debris collector assembly showing a standard round trash can suspended to the frame.
Figure 3A:
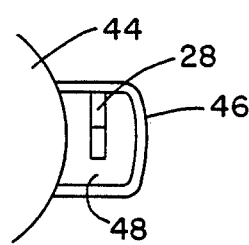
FIG. 3A is a fragmentary top view of the handle of the trash can with a suspending finger entrainied in the handle.

Referring to FIG. 3 there is shown a standard round trash cans 44 having a pair of lifting means such as handles 46 defining apertures 48 through which upward projections 28 are inserted.

The operation of the debris collector assembly is conventional. The air of the discharge stream inflates the cover 36. The air in excess of that needed to inflate the cover 36 excapes through the perforations 38. The debris entrained in air discharge stream falls into the receptacle 44.

Referring to FIG. 5 there is shown an alternate form of a frame 16. In this configuration the vertical supports contains lower vertical support tubes 50 each containing an upper vertical support tube 52 entrained within the lower vertical support tubes 50. The right upper vertical support tube contains an integral S-shaped lateral projection 30. The crossbar 24 of the u-shaped cross member 23 contains a plurality of holes 53 flanking the bolts 26 to permit the separation "X" of the vertical support members to be varied and accommodate mowers of different makes and models.

FIG. 5 also illustrates the versatility of the brackets 27 in their ability to accommodate various types of receptacles i.e. receptacles which include inside and outside handle means or various spacings between handles.

Note that the left bracket 27 is mounted on the outside of the arm thus maximizing the distance between the arm 22 and the center of the crossbar 24. On the other hand the right bracket—in FIG. 5—is mounted on the inside of the arm 22 thus minimizing the distance between the finger 28 and the center of the crossbar 24. In FIG. 5 it was necessary to reverse the placement of the left and right brackets shown in FIG. 1.

It is quite clear that the ability to mount the bracket 27 in various positions permits the frame to accommodate receptacles of different configurations and spacing between the handles.

Figures 6, 6A:
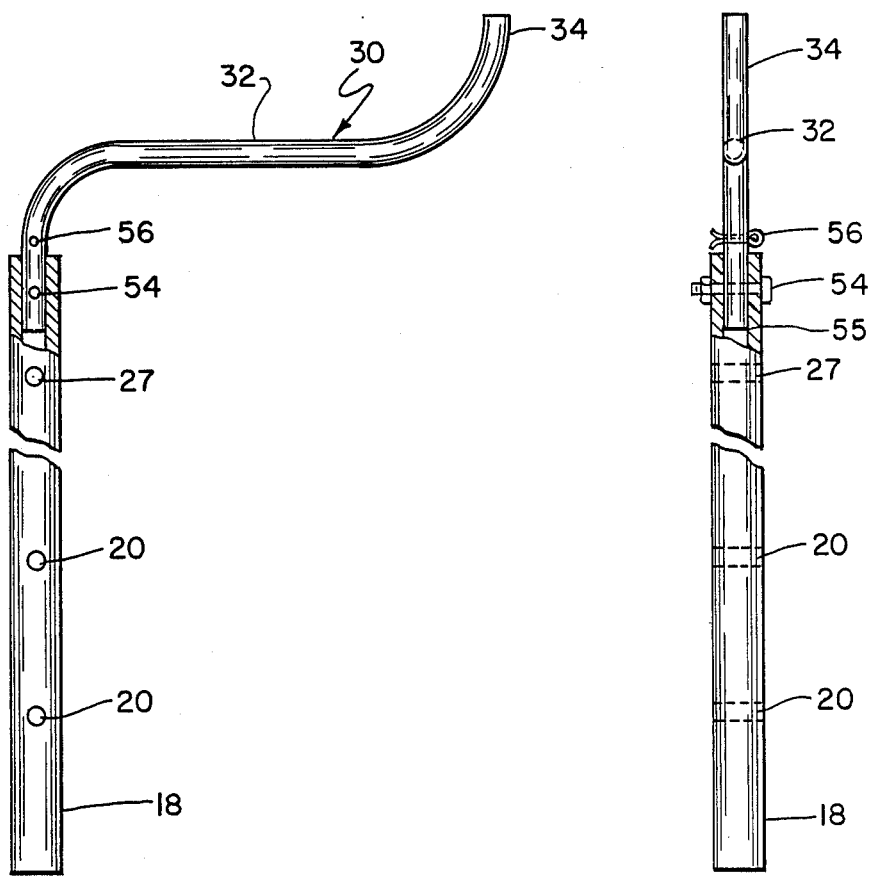
FIG. 6 illustrates an alternate form of a lateral projection.
FIG. 6A illustrates another view of the FIG. 6 alternate lateral projection.

Referring now to FIGS. 6 and 6A there is shown an alternate form of the lateral projection 30. This configuration is also S-shaped. A depending end 55 is entrained in a vertical support tube 18. While it is possible to support the depending end 55 in the tube 18 by means of a friction fit, the illustrated form sits loosely within the tube 18 and is supported in place by a pin 56. A second pin preferably a shear pin 54 holds the lateral projection 30 from rotating.

A feature of this construction is the ability of the lateral projection 30 to rotate about a vertical axis within the tube 18 when the shear pin 54 is removed. Rotating the lateral projection either forward or rearward facilitates the removal of the chute and disassembly of the frame. In addition the lateral projection will rotate in the event contact is made with an obstruction and the shear pin severed.

The described debris collector frame and assembly is inexpensive to make. It can be assembled and secured to a mower with the minimum of tools. It can be be adapted to many makes of mowers as it is mounted by four screws.

The debris collector assembly utilizes standard trash cans which can be used directly or with a liner for collecting debris. The trash can is suspended and free to swing relative to the frame and mower to prevent detachment when travelling over rough terrain. The trash can can be filled to capacity thus reducing emptying or replacement time.

The sloping edge 29 on the trapezoid fingers 28 allow the receptacle to pivot freely about the fingers 28 when the bottom of the receptacle hits an obstruction during forward motion or when the mower is moving uphill.

More particularly the design lends itself for almost universal appeal. The various features and advantages of the invention are thought to be clear from the foregoing description. Various other features and advantages not specifically enumerated will undoubtedly occur to those versed in the art, as will many variations and modifications of the preferred embodiment illustrated, all of which may be achieved without departing from the spirit and scope of the invention as defined by the claims.

We claim:

1. A frame for adapting a mower for utilizing a conventional debris receptacle, said mower having a chute interconnecting a debris discharge opening in the housing of the mower to a cover for the debris receptacle, said debris receptacle having oppositely disposed handle means for lifting and transporting the debris receptacle, the frame comprising :
  an elongated support member, the lower end of which has means for securing the support member to a mower so that the support member is vertically oriented;
  a U-shaped cross member having a pair of spaced apart arms joined to a crossbar joined to the upper end of the support member so that the arms extend transversely relative to the support member to at least partially encircle a debris receptacle; and a bracket mounted on the end of each arm, said bracket including raised projecting means extending above the arms for engaging the handle means of the debris receptacle for suspending and transporting the debris receptacle.

2. A frame as defined in claim 1 where the support member includes a pair of normally parallel elongated members, one of said elongated members contains a lateral projection for supporting said chute and said cover.

3. A frame as defined in claim 1 where the handle means contain apertures and the raised projecting means are configured and sized to fit within the apertures.

4. A frame as defined in claim 1 where said raised projecting means have a rear sloping edge and a forward vertical edge for enabling the receptacle to pivot about the raised projection.

5. A frame as defined in claim 2 where the support members are tubular members and said lateral projection is a S-shaped member with a depending terminal end entrained within a support tube.

6. A frame as defined in claim 5 where the support tube and the depending end are rotatable relative to one another and each contains aligned coacting holes to receive a shear pin to detachably prevent such rotation.

7. A frame assembly for adapting a mower for utilizing a conventional debris receptacle, said mower having a chute interconnecting a debris discharge opening in the housing of the mower to a cover for the debris receptacle, said debris receptacle having oppositely disposed handle means for lifting and transporting the debris receptacle, the frame assembly comprising :

a debris receptacle having handle means for lifting and transporting the receptacle;

an elongated support member, the lower end of which has means for securing the support member to a mower so that the support member is vertically oriented;

a U-shaped cross member having a pair of spaced apart arms joined to a crossbar joined to the upper end of the support member so that the arms extend transversely relative to the support member to at least partially encircle a debris receptacle; and a bracket mounted on the end of each arm, said bracket also including raised projecting means extending above the arms for engaging the handle means of the debris receptacle for suspending and transporting the debris receptacle.

a cover for the receptacle having perforations to permit air to escape, an inlet and an adjustable opening for conforming to the shapes of conventional debris receptacles;

a chute joined to said inlet for linking a mower to the cover for carrying debris entrained in air to the inlet of the cover; and lateral projecting means for supporting the chute .

8. A frame assembly assembly as defined in claim 7 where the handle means include apertures and said projecting means are configured and sized to fit within the apertures for suspending and transporting the receptacle.

9. A frame assembly as defined in claim 8 where the upward projecting means are trapezoids.

10. A frame assembly as defined in claim 9 where the trapezoid contains a rear sloping edge and a front vertical edge to facilitate the rotation of the receptacle about the front edge.

11. A frame assembly as defined in claim 7 where the lateral projecting means is L- shaped with one end joined to a support member and a remote end having a upwardly directed raised end.

12. A frame assembly as defined in claim 7 where the support members are tubular and the lateral projecting means is S-shaped with a depending terminal end entrained within a support member.

13. A frame as defined in claim 12 where the support tube and the depending end are rotatable relative to one another and each contains aligned coacting holes to receive a shear pin to detachably prevent such rotation.

14. A frame as defined in claim 7 where the arms contain inside and outside surfaces and said bracket may be mounted to either surface to adjust the spacing between the raised projections.

* * * * *